US010334433B2

(12) United States Patent
Yaginuma et al.

(10) Patent No.: US 10,334,433 B2
(45) Date of Patent: Jun. 25, 2019

(54) TERMINAL DEVICE, MANAGEMENT DEVICE, COMMUNICATION SYSTEM, MEMORY MEDIUM, AND COMMUNICATION METHOD FOR NOTIFYING USERS OF AUTHENTICATION STATUS OF MULTIPLE TERMINAL DEVICES WITHIN A GROUP

(71) Applicant: JVC KENWOOD Corporation, Yokohama-shi, Kanagawa (JP)

(72) Inventors: Tomoko Yaginuma, Yokohama (JP); Ichiro Shishido, Yokohama (JP); Shunichi Manabe, Yokohama (JP); Masae Toko, Yokohama (JP); Kazuya Tsukamoto, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 163 days.

(21) Appl. No.: 15/212,195

(22) Filed: Jul. 16, 2016

(65) Prior Publication Data

US 2016/0330622 A1 Nov. 10, 2016

Related U.S. Application Data

(63) Continuation of application No. PCT/JP2014/075895, filed on Sep. 29, 2014.

(30) Foreign Application Priority Data

Jan. 31, 2014 (JP) .................................. 2014-016429

(51) Int. Cl.
*H04W 12/06* (2009.01)
*H04W 4/08* (2009.01)
(Continued)

(52) U.S. Cl.
CPC ............. *H04W 12/06* (2013.01); *H04W 4/08* (2013.01); *H04W 72/04* (2013.01);
(Continued)

(58) Field of Classification Search
None
See application file for complete search history.

(56) References Cited

U.S. PATENT DOCUMENTS 7,305,470 B2 * 12/2007 Tom .................... G06Q 20/3674
709/225
7,975,287 B2 * 7/2011 Hung .................... G06F 21/335
709/225
(Continued)

FOREIGN PATENT DOCUMENTS

JP 2004-350226 A 12/2004

*Primary Examiner* — Piotr Poltorak
(74) *Attorney, Agent, or Firm* — Brundidge & Stanger, P.C.

(57) ABSTRACT

A communication system is provided in which multiple terminal devices form a group and at least one base station device assigns a channel to each group, so that communication from a terminal device included in a group assigned a channel to the other terminal devices included in the group is performed. In the communication system, a transmitting unit transmits information about authentication to a base station device before communication is started. A receiving unit receives, from a base station device, information about authentication status of at least another terminal device within the group.

11 Claims, 16 Drawing Sheets

(51) Int. Cl.
  *H04W 72/04*   (2009.01)
  *H04W 72/12*   (2009.01)
  *H04W 84/08*   (2009.01)
  *H04W 88/08*   (2009.01)

(52) U.S. Cl.
  CPC .......... *H04W 72/121* (2013.01); *H04W 84/08* (2013.01); *H04W 88/08* (2013.01)

(56) References Cited

U.S. PATENT DOCUMENTS

| | | | |
|---|---|---|---|
| 2004/0158574 A1* | 8/2004 | Tom | G06F 17/30867 |
| 2005/0075986 A1* | 4/2005 | You | H04L 63/0435 |
| | | | 705/71 |
| 2005/0086514 A1* | 4/2005 | Han | H04L 63/0823 |
| | | | 726/26 |
| 2005/0154739 A1* | 7/2005 | Ikai | H04L 63/08 |
| 2005/0204144 A1* | 9/2005 | Mizutani | G06F 3/1222 |
| | | | 713/182 |
| 2007/0025464 A1* | 2/2007 | Perlman | H04B 7/0684 |
| | | | 375/267 |
| 2007/0053308 A1* | 3/2007 | DuMas | H04L 45/00 |
| | | | 370/254 |
| 2007/0199075 A1* | 8/2007 | Skoric | H04L 9/3268 |
| | | | 726/27 |
| 2007/0220005 A1* | 9/2007 | Castro Castro | H04W 4/08 |
| 2008/0013525 A1* | 1/2008 | Sakaguchi | H04L 29/06027 |
| | | | 370/352 |
| 2009/0089869 A1* | 4/2009 | Varghese | G06F 21/31 |
| | | | 726/7 |
| 2009/0180144 A1* | 7/2009 | Ito | G06K 15/00 |
| | | | 358/1.16 |
| 2009/0234910 A1* | 9/2009 | Chung | H04L 63/0414 |
| | | | 709/203 |
| 2009/0296939 A1* | 12/2009 | Struik | H04L 63/065 |
| | | | 380/278 |
| 2010/0116880 A1* | 5/2010 | Stollman | G06Q 20/10 |
| | | | 235/380 |
| 2010/0220351 A1* | 9/2010 | Makam | G06F 3/121 |
| | | | 358/1.15 |
| 2010/0319055 A1* | 12/2010 | Tamura | H04L 63/105 |
| | | | 726/4 |
| 2011/0317684 A1* | 12/2011 | Lazzaro | G06Q 30/04 |
| | | | 370/352 |
| 2012/0131018 A1* | 5/2012 | Shishido | G06F 17/30867 |
| | | | 707/748 |
| 2012/0317287 A1* | 12/2012 | Amitai | H04L 61/103 |
| | | | 709/225 |
| 2013/0046766 A1* | 2/2013 | Shishido | G06F 17/30752 |
| | | | 707/741 |
| 2013/0174277 A1* | 7/2013 | Kiukkonen | H04L 63/104 |
| | | | 726/28 |
| 2013/0303227 A1* | 11/2013 | Liang | H04W 4/08 |
| | | | 455/519 |
| 2014/0096215 A1* | 4/2014 | Hessler | H04L 63/0869 |
| | | | 726/7 |
| 2014/0329498 A1* | 11/2014 | Cherian | H04W 12/06 |
| | | | 455/411 |
| 2014/0359148 A1* | 12/2014 | Cherian | H04L 41/28 |
| | | | 709/229 |
| 2015/0033297 A1* | 1/2015 | Sanso | H04L 63/104 |
| | | | 726/5 |
| 2015/0244699 A1* | 8/2015 | Hessler | G06F 21/44 |
| | | | 726/7 |
| 2016/0330622 A1* | 11/2016 | Yaginuma | H04W 4/08 |
| 2017/0019791 A1* | 1/2017 | Shishido | H04L 63/104 |

* cited by examiner

FIG.4A

| GROUP NAME | TERMINAL DEVICE ID | AUTHENTICATION RESULT |
|---|---|---|
| 1 | 6700 | AUTHENTICATED |
| 1 | 1234 | UNAUTHENTICATED |
| 1 | 8100 | AUTHENTICATED |
| 1 | 5515 | AUTHENTICATED |
| ... | ... | ... |
| 2 | 6450 | AUTHENTICATED |
| 2 | 4321 | UNAUTHENTICATED |
| ... | ... | ... |

FIG.4B

| GROUP NAME | TERMINAL DEVICE ID | USER NAME | AUTHENTICATION RESULT |
|---|---|---|---|
| 1 | 6700 | Tom | AUTHENTICATED |
| 1 | 1234 |  | UNAUTHENTICATED |
| 1 | 8100 | Alice | AUTHENTICATED |
| 1 | 5515 | Bob | AUTHENTICATED |
| ... | ... | ... | ... |
| 2 | 6450 | Mick | AUTHENTICATED |
| 2 | 4321 |  | UNAUTHENTICATED |
| ... | ... | ... | ... |

FIG.5

| ID1 (24) | AUTHENTI- CATION RESULT OF ID1 (1) | ID2 (24) | AUTHENTI- CATION RESULT OF ID2 (1) |
|---|---|---|---|

FIG.14

| THE NUMBER OF AUTHENTI- CATED USERS | | THE NUMBER OF UNAUTHENTI- CATED USERS | |
|---|---|---|---|

TERMINAL DEVICE, MANAGEMENT DEVICE, COMMUNICATION SYSTEM, MEMORY MEDIUM, AND COMMUNICATION METHOD FOR NOTIFYING USERS OF AUTHENTICATION STATUS OF MULTIPLE TERMINAL DEVICES WITHIN A GROUP

CROSS-REFERENCE TO RELATED APPLICATION

This application is based upon and claims the benefit of priority from the prior Japanese Patent Application No. 2014-016429, filed on Jan. 31, 2014, the entire contents of which are incorporated herein by reference.

BACKGROUND

1. Field

The present invention relates to a notification technique, and particularly to a terminal device, a management device, a communication system, a memory medium, and a communication method used to notify a user of authentication status of multiple terminal devices within a group.

2. Description of the Related Art

In a mobile telephone set, terminal setting information or personal information to be set is changed according to the use environment. For example, in a mobile telephone set lent for business purposes, the setting is changed according to whether the use is for a business purpose or a personal purpose. Also, a mobile telephone set used less frequently in a house may be shared by multiple people (Patent Document 1, for example).

[Patent Document 1] Japanese Patent Application Laid-open No. 2004-350226

In a business-use wireless system, multiple terminal devices form a group, and a base station device assigns a channel to the group. In such a business-use wireless system, conversation within a group is mainly performed with the one-to-many conversation style. Generally, multiple terminal devices of a business-use wireless system are placed in an office, and a user heads to a site carrying one of the terminal devices. Accordingly, authentication operation is not required and the same setting is provided in the multiple terminal devices so as to enable any user to use any terminal device in the same way. In such a situation, however, in order to improve communication security, authentication of a user using a terminal device should be required. On the other hand, users' convenience may be reduced if authentication is required of all users in the abovementioned usage.

SUMMARY

To solve the problem above, an aspect of the present embodiment relates to a terminal device used in a communication system in which a plurality of terminal devices form a group and at least one base station device assigns a channel to each group so that communication is performed. The terminal device comprises: a receiving unit that receives, from a base station device, information regarding authentication status of at least another terminal device within the group; and a conveying unit that outputs authentication status in the group on the basis of information received by the receiving unit.

Another aspect of the present embodiment relates to a management device. The management device is used in a communication system in which a plurality of terminal devices form a group and at least one base station device assigns a channel to each group so that communication is performed. The management device comprises: a generating unit that generates information regarding authentication status of a terminal device within a group; and a transmitting unit that transmits information generated by the generating unit to a terminal device.

Yet another aspect of the present embodiment relates to a communication system. In the communication system, a plurality of terminal devices form a group and at least one base station device assigns a channel to each group so that communication is performed. The communication system comprises: a terminal device that receives, from a base station device, information regarding authentication status of at least another terminal device within the group; and a management device that transmits information regarding authentication status of at least another terminal device within the group.

Still yet another aspect of the present embodiment relates to a memory medium. The memory medium is a non-transitory computer-readable memory medium storing a computer program for a terminal device used in a communication system in which a plurality of groups each including a plurality of terminal devices are formed and each of a plurality of base station devices assigns a channel to each group so that communication is performed. The computer program comprises: receiving, from a base station device, information regarding authentication status of at least another terminal device within the group; and conveying authentication status in the group on the basis of received information.

Still yet another aspect of the present embodiment relates to a communication method. The communication method is performed by a terminal device used in a communication system in which a plurality of terminal devices form a group and at least one base station device assigns a channel to each group so that communication is performed. The communication method comprises: receiving, from a base station device, information regarding authentication status of at least another terminal device within the group; and conveying authentication status in the group on the basis of received information.

A further aspect of the present embodiment relates to a memory medium. The memory medium is a non-transitory computer-readable memory medium storing a computer program for a management device used in a communication system in which a plurality of terminal devices form a group and at least one base station device assigns a channel to each group so that communication is performed. The computer program comprises: generating information regarding authentication status of a terminal device within a group; and transmitting generated information to a terminal device.

Optional combinations of the aforementioned constituting elements, and implementations of the present embodiments in the form of methods, apparatuses, systems, recording media, and computer programs may also be practiced as additional modes of the present embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 4A-4B are diagrams that each show a data structure of a database stored in a storage unit shown in FIG. 3;

FIG. 5 is a diagram that shows an example of a data structure output from a communication unit shown in FIG. 3;

FIG. 14 is a diagram that shows a structure of data output from the management device according to a second embodiment;

DETAILED DESCRIPTION

The invention will now be described by reference to the preferred embodiments. This does not intend to limit the scope of the present invention, but to exemplify the invention.

First Embodiment

A general description will be given before the present invention is specifically described. The first embodiment relates to a business-use wireless system comprising multiple base station devices connected to a network, multiple terminal devices connected to the respective base station devices, and a management device connected to the network. In a business-use wireless system, multiple terminal devices form a group. A base station device assigns an uplink channel and a downlink channel to a group. In such a situation, one terminal device in a group (hereafter, referred to as a "sending device") transmits a signal using an uplink channel, and another terminal device in the group (hereafter, referred to as a "receiving device") receives the signal using a downlink channel. Since another base station device, different from the base station device connected to the sending device, also assigns a downlink channel to the group, a receiving device connected to the another base station device can also receive the signal. A similar operation is performed for another group, but communication between different groups is not performed.

As stated previously, in order to ensure communication security, user authentication should be required to use a terminal device. However, when users' convenience is considered, performing no authentication is preferable. In order to meet both the requirements, in the business-use wireless system according to the first embodiment, user authentication is performed when a part of users use a terminal device, and user authentication is not performed when the other users use a terminal device. Further, the authentication results are shared by multiple terminal devices within the group. A user using a terminal device checks whether or not user authentication has been performed for the other terminal devices within the group before starting communication. For example, the user can appropriately select the communication contents according to whether user authentication has been performed for all the terminal devices (the other terminal devices), for a part of the terminal devices, or for no terminal device.

Figure 1:
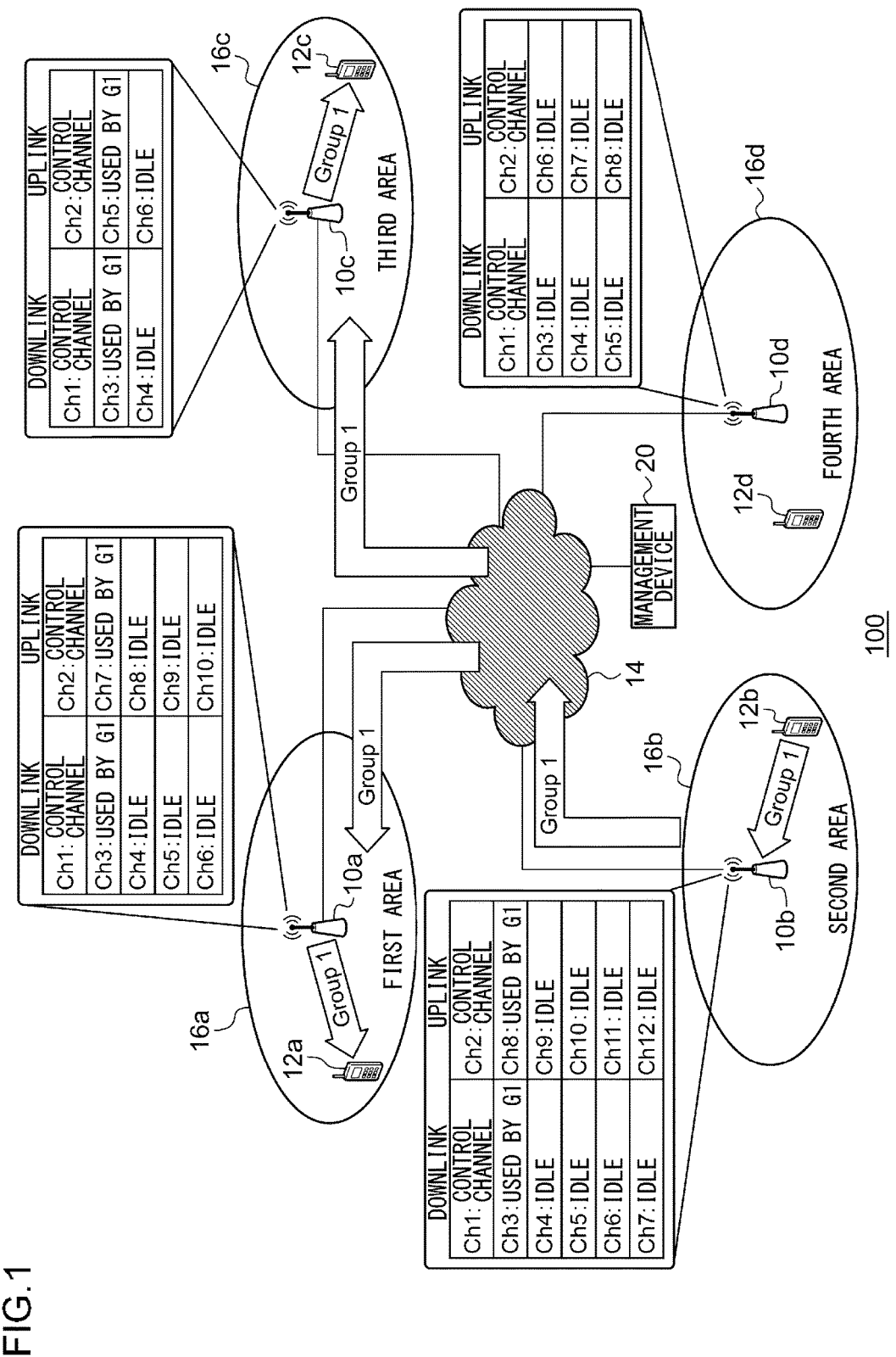
FIG. 1 is a diagram that shows a configuration of a business-use wireless system according to a first embodiment.

FIG. 1 shows a configuration of a business-use wireless system 100 according to the first embodiment. The business-use wireless system 100 comprises a first base station device 10a, a second base station device 10b, a third base station device 10c, and a fourth base station device 10d, which are collectively referred to as base station devices 10, a first terminal device 12a, a second terminal device 12b, a third terminal device 12c, and a fourth terminal device 12d, which are collectively referred to as terminal devices 12, a network 14, and a management device 20. The first base station device 10a forms a first area 16a, the second base station device 10b forms a second area 16b, the third base station device 10c forms a third area 16c, and the fourth base station device 10d forms a fourth area 16d. The first area 16a, the second area 16b, the third area 16c, and the fourth area 16d are collectively referred to as areas 16. The number of the base station devices 10 and the number of the terminal devices 12 are not limited to "four".

The first base station device 10a through the fourth base station device 10d are connected to one another via the network 14. Each of the base station devices 10 can set multiple channels and assigns the channels to groups. For the channels, a publicly-known technique may be employed. As an example, it is assumed here that multiple channels are multiplexed using frequency division multiple access and frequency division duplex (FDMA/FDD). For example, the first base station device 10a sets Ch1 and Ch3 through Ch6 as downlink channels and sets Ch2 and Ch7 through Ch10 as uplink channels. The channel Ch1 is used for a downlink control channel, and Ch2 is used for an uplink control channel. Also, a pair of Ch3 and Ch7 are assigned to the same group. Similarly, Ch4 through Ch6 and Ch8 through Ch10 are assigned. Other base station devices 10 also set channels in a similar way, but the number of channels to be set may be different for each base station device 10. Further, Ch1 and Ch2 are used in common by all the base station devices 10 for a downlink control channel and an uplink control channel.

A terminal device 12 is a wireless terminal that can communicate with another terminal device 12 via a base station device 10. It is assumed here that conversation is performed as the communication. Also, data communication may be performed. When a terminal device 12 enters an area 16, the terminal device 12 requests the base station device 10 forming the area 16 to perform position registration. At the time, registration of the group that is to use the area is also requested. These requests are included in an uplink control channel and transmitted using Ch2. The uplink control channel is transmitted using random access. In response to the requests, the base station device 10 registers terminal devices 12 in units of groups.

When a terminal device 12 is to make a call, the terminal device 12 transmits an uplink control channel including a call request using Ch2. A base station device 10 that has received the uplink control channel regards the terminal device 12 as the sending device set forth above and assigns channels to the group in which the sending device is included. The channels collectively mean a downlink channel and an uplink channel. The base station device 10 then requests, via the network 14, another base station device 10 to assign channels to the group. In response to the request, the another base station device 10 checks if the group has been registered. If the group has been registered, the another base station device 10 will assign channels to the group.

Each of the base station device 10 and the another base station device 10 transmits to a terminal device 12 a downlink control channel including information regarding the assigned channels. Each of the sending device and receiving devices, i.e., the other terminal devices 12 in the group, receives the downlink control channel to find the assigned channels. The sending device then transmits a signal to the base station device 10 using the assigned uplink channel. The signal includes a digitized audio signal. When there is a receiving device within the group in which the sending device is included, the base station device 10 transmits the signal to the receiving device using the assigned downlink channel. The base station device 10 also transmits the received signal to the another base station device 10. The another base station device 10 then transmits the signal to a receiving device using the assigned downlink channel. Accordingly, each of the receiving devices reproduces the audio signal based on the received signal and outputs a sound from a speaker.

In this way, multiple groups that each include multiple terminal devices 12 are formed. Also, each of multiple base station devices 10 assigns channels to each group. Consequently, communication is performed from one terminal device 12 included in a group to which channels are assigned, to the other terminal devices 12 within the group.

The sending device and a receiving device may be switched among multiple terminal devices 12 in a group. When there is a signal to be transmitted from a terminal device 12 that has operated as a receiving device, the terminal device 12 transmits an uplink control channel including a call request, as described previously, and switches to the sending device. Also, when a terminal device 12 operating as the sending device completes transmission of a signal, the terminal device 12 switches to a receiving device. In such a group call, one call uses one channel of each base station device 10. Accordingly, when terminal devices 12 included in the same group are registered in a wide range of base station devices 10, one call uses channels of which the number is equal to that of the base station devices 10. The processing above is performed for each group.

FIG. 1 shows the state where a call for a group 1 is made. The second terminal device 12b corresponds to the sending device. The second terminal device 12b transmits a signal using Ch8 of the second base station device 10b. The group 1 is registered in the first base station device 10a and the third base station device 10c. Accordingly, the first terminal device 12a receives the signal using Ch3 of the first base station device 10a, and the third terminal device 12c receives the signal using Ch3 of the third base station device 10c. Meanwhile, since the group 1 is not registered in the fourth base station device 10d, the signal from the second terminal device 12b is not output to the fourth base station device 10d.

For example, when the group 1 is registered only in the second base station device 10b and when a call for the group 1 is made, the sending device transmits a signal using Ch8 of the second base station device 10b, and a receiving device receives the signal using Ch3 of the second base station device 10b. Therefore, only a pair of channels of one base station device 10 are used. When the group 1 is registered in two base station devices 10 and when a call for the group 1 is made, a pair of channels of each of the two base station devices 10 are used. Namely, two pairs of channels are used. This corresponds to use of channels equal to that in one-to-one conversation performed in a cellular phone system or the like. Further, when the group 1 is registered in three or more base station devices 10, three or more pairs of channels are used. If all the channels of the third base station device 10c are used for other groups, a call for the group 1 will not be handled by the third base station device 10c. This corresponds to a failed call or busy state.

Prior to the communication processing, a terminal device 12 may perform authentication processing with a base station device 10. The authentication processing may be performed by an authentication device connected to the network 14 instead of by a base station device 10. Since a publicly-known technique may be used for the authentication processing, a specific description thereof is omitted here. A terminal device 12 transmits to a base station device 10 an authentication result, such as "authenticated" and "unauthenticated", using an uplink control channel. The management device 20 then receives the authentication result from the base station device 10. In response to the information transmitted by the terminal device 12, the management device 20 transmits information regarding authentication status of the other terminal devices 12 within the group. Accordingly, the base station device 10 transmits the information regarding authentication status using a downlink control channel. The terminal device 12 receives and displays the information regarding authentication status. Accordingly, the user using the terminal device 12 can find the authentication status of the other terminal devices 12 within the group.

Figure 2:
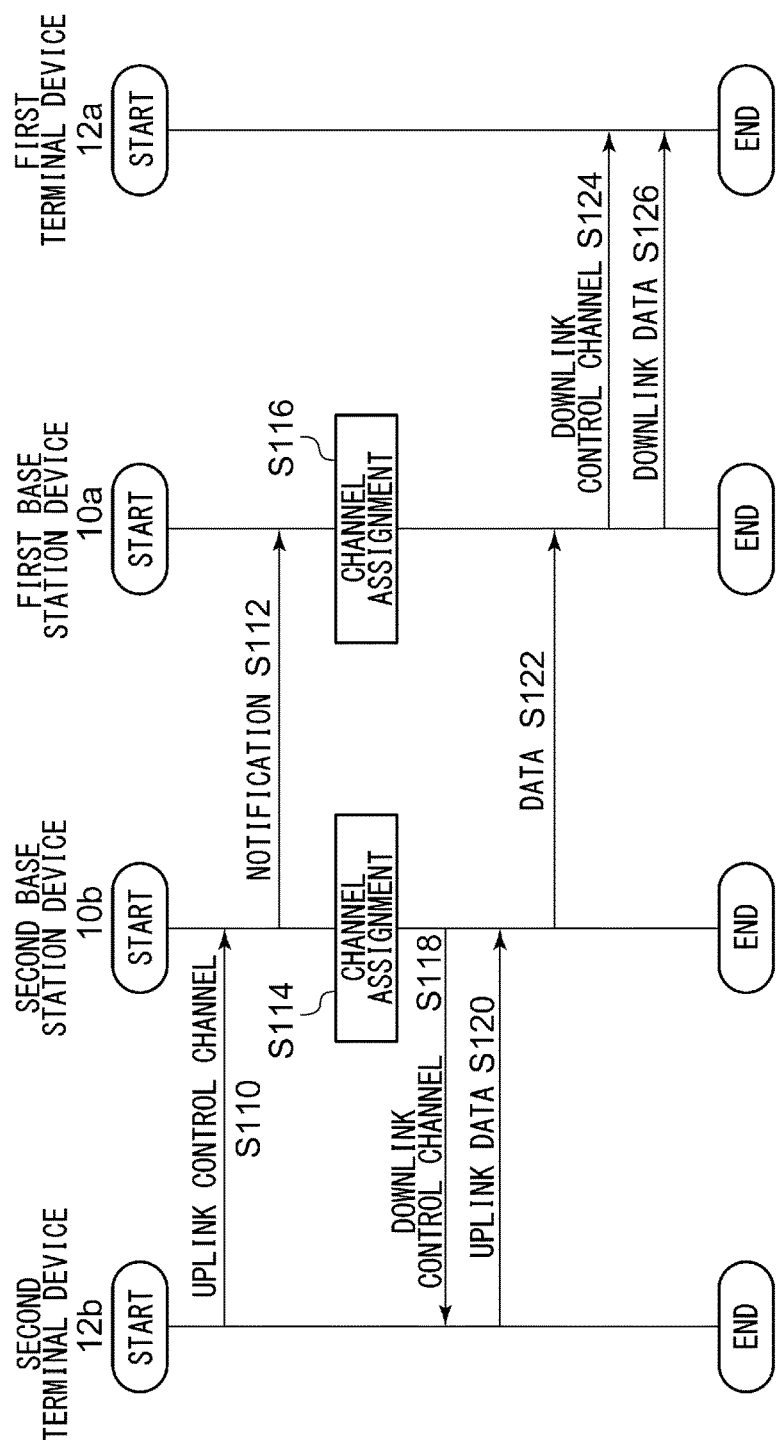
FIG. 2 is a sequential diagram that shows a communication procedure performed in the business-use wireless system shown in FIG. 1.

FIG. 2 is a sequential diagram that shows a communication procedure performed in the business-use wireless system 100. The second terminal device 12b transmits a call request using an uplink control channel (S110). The second base station device 10b then notifies the first base station device 10a of the call request (S112). Each of the second base station device 10b and the first base station device 10a assigns channels to the group 1 (S114, S116). Accordingly, the second base station device 10b transmits the assignation result using a downlink control channel (S118). The second terminal device 12b then transmits uplink data to the second base station device 10b (S120). The second base station device 10b transmits the data to the first base station device 10a (S122). The first base station device 10a transmits the assignation result using a downlink control channel (S124). The first base station device 10a then transmits the downlink data to the first terminal device 12a (S126).

Figure 3:
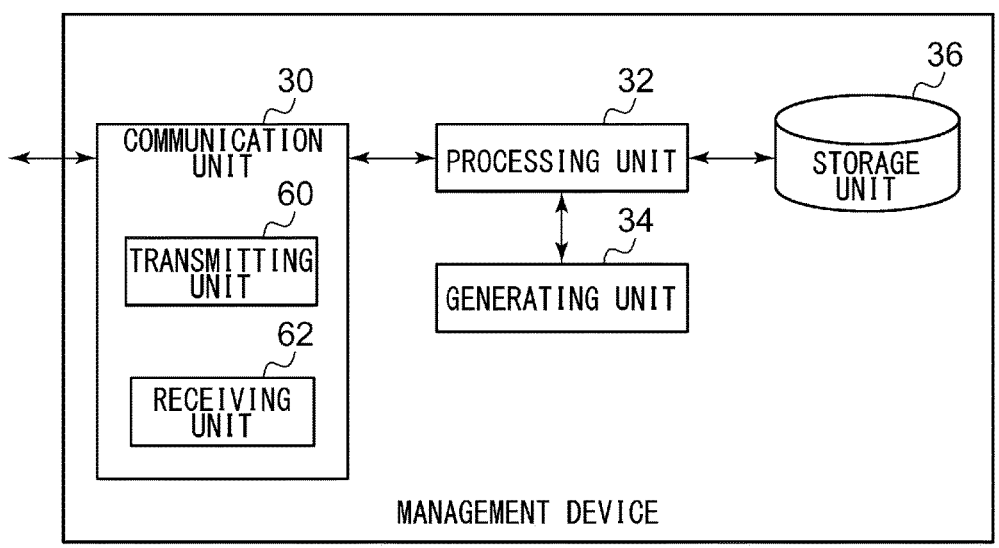
FIG. 3 is a diagram that shows a configuration of a management device shown in FIG. 1.

FIG. 3 shows a configuration of the management device 20. The management device 20 comprises a communication unit 30, a processing unit 32, and a generating unit 34. The communication unit 30 includes a transmitting unit 60 and a receiving unit 62.

The receiving unit 62 is connected to the network 14 and receives authentication result information from a terminal device 12 via a base station device 10. The processing unit 32 receives authentication result information from the receiving unit 62 and stores the information in a database. A storage unit 36 stores, as a database, authentication result information of multiple terminal devices 12 included in each group. Each of FIGS. 4A-4B shows a data structure of a database stored in the storage unit 36. In the example shown in FIG. 4A, "group name", "terminal device ID", and "authentication result" are included. The group name (group number) shows identification information of the group in which the terminal device 12 is included, and "terminal device ID", also called "Unit ID", is a number that uniquely identifies the terminal device. The authentication result "authenticated" means that the terminal device has been authenticated, and the authentication result "unauthenticated" means that the terminal device has not been authenticated. In addition, "user name" may also be stored, as shown in the example of FIG. 4B. If an authentication result includes a user name, the user name will be recorded when the authentication result of the terminal device is "authenticated", and the user name field will be left blank when the authentication result of the terminal device is "unauthenticated", as will be described later. The description will now return to FIG. 3.

The generating unit 34 receives a database stored in the storage unit 36 via the processing unit 32. The generating unit 34 then extracts information related to a group to be processed from the database. The group to be processed corresponds to a group in which a terminal device 12 that has transmitted an authentication result is included. The generating unit 34 generates information regarding authentication status by combining pieces of authentication result information of terminal devices 12 in the group. FIG. 5 is a diagram that shows an example of a data structure output from the communication unit 30. FIG. 5 shows an example in which information regarding authentication status generated by the generating unit 34 is transmitted using a message called "Broadcast Identified Data". The "Broadcast Identified Data" is a message conveyed using a downlink control channel from a base station device 10.

In FIG. 5, "ID1" is a terminal device ID (Unit ID) for identifying the first terminal device 12 and consists of 24 bits, for example. The "authentication result of ID1" is an authentication result of the user of the first terminal device 12 and consists of 1 bit. For example, the "authentication result of ID1" is "1" when the user has been authenticated and is "0" when the user has not been authenticated. The "ID2" and "authentication result of ID2" show the terminal device ID and authentication result of the second terminal device 12 and are configured in the same way as the "ID1" and "authentication result of ID1". In this way, Broadcast Identified Data consists of 50 bits, and 64 bits can be transmitted at a time using a downlink control channel. Namely, authentication status of two users can be transmitted at a time. Thus, based on authentication result information received by the receiving unit 62, the generating unit 34 generates information regarding authentication status of terminal devices 12 in the group to which the subject terminal device 12 belongs. When authenticated user names are stored in the database in the storage unit 36, as shown in FIG. 4B, the communication unit 30 outputs data in which "terminal device ID", "authentication result", and "user name" are related to one another. The description will now return to FIG. 3.

The transmitting unit 60 transmits, to a base station device 10 via the network 14, information regarding authentication status generated by the generating unit 34. As stated previously, the base station device 10 transmits the information regarding authentication status to the terminal device 12 using a downlink control channel.

The configuration described above may be implemented by a CPU or memory of any given computer, an LSI, or the like in terms of hardware, and by a memory-loaded program or the like in terms of software. In the present embodiment is shown a functional block configuration realized by cooperation thereof. Therefore, it would be understood by those skilled in the art that these functional blocks may be implemented in a variety of forms by hardware only, software only, or a combination thereof.

Figure 6:
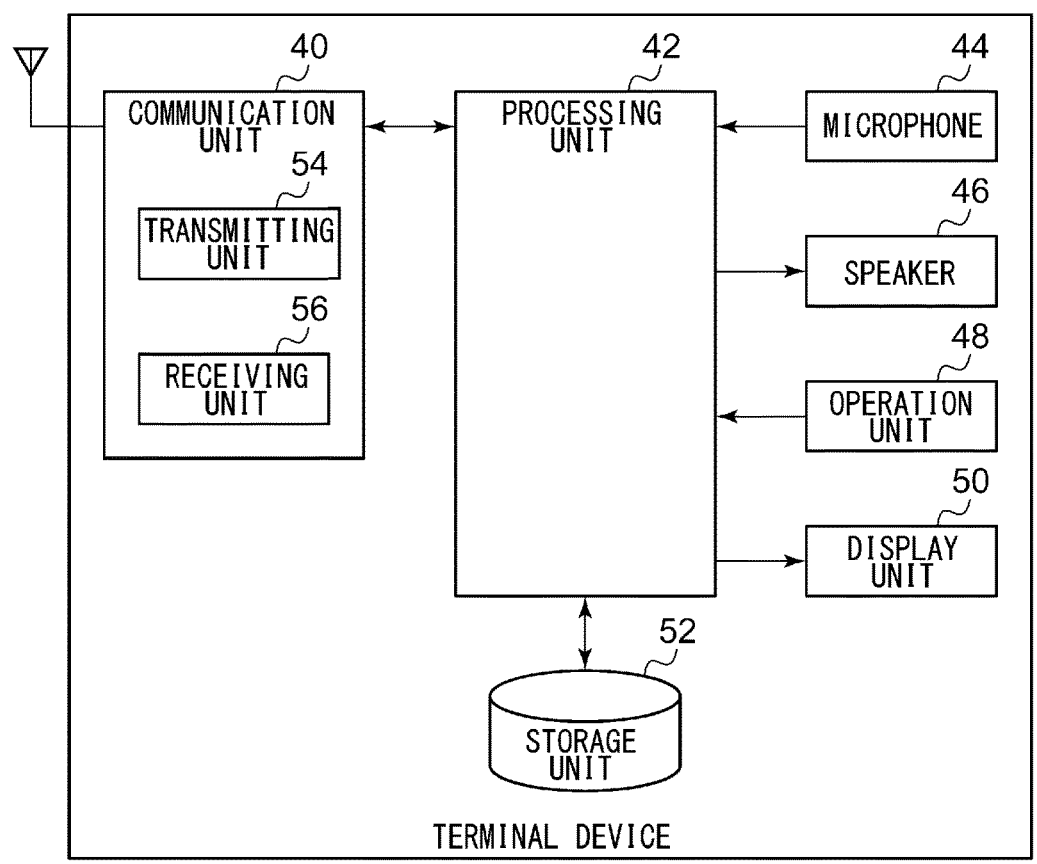
FIG. 6 is a diagram that shows a configuration of a terminal device shown in FIG. 1.

FIG. 6 shows a configuration of a terminal device 12. A terminal device 12 comprises a communication unit 40, a processing unit 42, a microphone 44, a speaker 46, an operation unit 48, a display unit 50, and a storage unit 52. The communication unit 40 includes a transmitting unit 54 and a receiving unit 56.

The microphone 44 receives a sound from a user during a call and converts the sound to an audio signal. The microphone 44 then outputs the audio signal to the processing unit 42. The speaker 46 receives an audio signal from the processing unit 42 and outputs the audio signal as a sound during a call. The speaker 46 may also output a warning sound or the like. The operation unit 48 comprises a button, a touch panel, and the like and receives input from a user. The operation unit 48 then outputs the received input to the processing unit 42. The display unit 50 receives and displays an image and a message from the processing unit 42. When the screen is a touch panel, the display unit 50 and the operation unit 48 are integrally configured. Also, the terminal device 12 may be configured not to include the display unit 50 and connected to a display device (not illustrated) so as to allow the external display device to display information.

The processing unit 42 performs, in cooperation with the communication unit 40, authentication processing with a base station device 10, an authentication device (not illustrated), or the management device 20. Although not shown in FIG. 3, the management device 20 may be provided with an authentication processing unit to perform authentication processing. For the authentication processing, a publicly-known technique, such as a password and a passcode, may be employed. Master data necessary for the authentication processing, such as passwords, may be stored outside the terminal device 12 (in a base station device 10, an authentication device, or the management device 20, for example) or may be stored in the terminal device 12. Since master data for authentication processing can be collectively managed, storing the master data outside the terminal device 12 is basically desirable and is especially suitable for the case where change of a password or addition or deletion of a user is frequently performed. Meanwhile, since the system configuration can be simplified, storing the master data within the terminal device 12 may be suitable for a small system or for a system in which the master data needs to be updated less frequently. As a user authentication method, the following methods can be used.

The first user authentication method is to authenticate a user as a group member. For example, it may be a method in which the group members are limitedly notified of a password (a predetermined character string or numerical string) in advance and are required to enter the password thereafter. This method is simple as only one password needs to be set for one group, but each individual user cannot be authenticated. If one terminal device needs to be authenticated for multiple groups concurrently, multiple passwords for the groups may be entered.

The second authentication method is to set a different user name (user ID) and a different password for each user. For authentication, a user enters the user's own user name and password via the operation unit 48. This method enables authentication of each individual user. Also, it may be a method in which each user is given a different password, a user name and a password are related to each other and stored as master data, and a user is only required to enter a password. This method can omit the entry of a user name, reducing the operational burden on a user. The device storing the master data (device performing password matching) determines whether or not the master data includes a password identical with that entered by a user, and, if the master data includes the password, the device will recognize that the corresponding user has entered the password, so as to authenticate the user.

The authentication processing may be started by turning the terminal device 12 on while holding down any key on the operation unit 48, for example. Also, the authentication processing may be started according to setting provided before the terminal device 12 is turned off. Further, the authentication processing may be set to start when the terminal device 12 is turned on, using application software for wireless device setting in advance. For the authentication processing, the communication unit 40 uses an uplink control channel and a downlink control channel. As stated previously, the authentication processing is performed before communication is started.

When the master data for authentication processing is stored outside the terminal device 12, the terminal device 12 transmits information including the terminal device ID, a password entered by a user, and a user name (if entered), via the transmitting unit 54 to a base station device 10. Textual information including passwords should desirably be encrypted and transmitted. When the base station device 10 stores the master data for authentication processing, the base station device 10 performs matching between the received password and user name and the master data to determine the authentication result. The base station device 10 then notifies the management device 20 of the authentication result information. The authentication result information includes the terminal device ID and the authentication result and may also include the user name. The processing unit 32 of the management device 20 receives the authentication result information from the base station device 10 via the receiving unit 62 and stores the authentication result information in the database in the storage unit 36. When the authentication result information does not include a user name, the storage unit 36 stores the information in the format shown in FIG. 4A and, when the authentication result information includes a user name, the storage unit 36 stores the information in the format shown in FIG. 4B. In the same way, when a device other than the terminal device 12 and base station device 10 stores the master data for authentication processing, the device may notify the management device 20 of the authentication result.

There will now be described processing to be performed in the case where a terminal device 12 stores the master data for authentication processing. The processing unit 42 performs matching between a password entered by a user and a user name (if entered) and the master data to determine the authentication result. Prior to starting communication, the processing unit 42 transmits, in cooperation with the transmitting unit 54, the authentication result information to a base station device 10. The authentication result information includes the terminal device ID and the authentication result and may also include the user name. As an example of data structure with which the authentication result information is transmitted, one bit of a random access request in an uplink control channel is used for transmission of an authentication result. The bit is set to "1" when the result is "authenticated" and is set to "0" when the result is "unauthenticated". This data structure can be used when the authentication result information does not include a user name. The base station device 10 then outputs the authentication result information to the management device 20.

Also, by devising the use of terminal device IDs when the processing unit 42 transmits, in cooperation with the communication unit 40, a message for position registration to a base station device 10, an authentication result can be transmitted using such a general position registration message. For example, the terminal device IDs may be divided into authenticated IDs and unauthenticated IDs to be used. More specifically, the terminal device IDs 0-5000 are assigned as unauthenticated IDs and the terminal device IDs 5001 and greater are assigned as authenticated IDs, and two terminal device IDs, an unauthenticated ID and an authenticated ID, are assigned to each terminal device 12 and stored in the storage unit 52. For example, when the unauthenticated ID of the first terminal device 12a is "1" and the authenticated ID thereof is "5001", the processing unit 42 selects the ID "5001" when the first terminal device 12a has been authenticated, and the processing unit 42 selects the ID "1" when the first terminal device 12a has not been authenticated; the processing unit 42 then transmits, via the transmitting unit 54, a general position registration message including the selected ID. Accordingly, the base station device 10 that has received the position registration message can determine whether or not the terminal device 12 has been authenticated by checking whether or not the ID included in the message is "5001" or greater. With such a method, an authentication result of a terminal device 12 can be transmitted to a base station device 10 using a general position registration message, without adding a new communication protocol. Also, if processing for adding a terminal device 12 to a group can be performed, the business-use wireless system 100 may convey information of a terminal device 12 newly added to a group, only to the group. As stated previously, for user authentication, a terminal device 12 transmits either information including a password necessary for authentication processing performed by another device (an authentication request) or information regarding the result of authentication processing performed by the terminal device 12 (an authentication result). The information transmitted at the time is referred to as individual information or individual authentication information. Also, such individual information or individual authentication information transmitted from a terminal device 12 is referred to as information regarding authentication.

As a response to authentication result information transmitted by the transmitting unit 54, the receiving unit 56 receives, from the base station device 10, information regarding authentication status of the other terminal devices 12 within the group. As stated previously, the information regarding authentication status is generated by the management device 20 and transmitted using a downlink control channel. Basically, the management device 20 generates the information regarding authentication status for all the terminal devices 12 within the group. Accordingly, the same data (information regarding authentication status) can be transmitted to all the terminal devices 12 at the same time, so that efficient communication is enabled. In some cases, information regarding authentication status of a terminal device 12 (the first terminal device 12a, for example) may be excluded from information regarding authentication status to be transmitted to the terminal device (first terminal device 12a).

The information regarding authentication status may be received at a different time. For example, the processing unit 42 transmits, via the transmitting unit 54 to a base station device 10, a transmission request for transmitting information regarding authentication status. This operation may be performed when a user presses an authentication status acquisition key on the operation unit 48 or at a periodic time measured with a timer. At the time, an uplink control channel is used. The transmission request is then output from the base station device 10 to the management device 20. As a response to the transmission request, the receiving unit 56 receives information regarding authentication status from the base station device 10. The receiving unit 56 then outputs the information regarding authentication status to the processing unit 42. Also, when registration processing for another terminal device 12 is successfully performed, the receiving unit 56 receives information regarding the addition of the another terminal device 12 newly registered, in a downlink control channel.

The processing unit 42 receives the information regarding authentication status from the receiving unit 56. Based on the information regarding authentication status, the processing unit 42 generates a screen for presenting the other terminal devices 12 within the group.

Figure 7A:
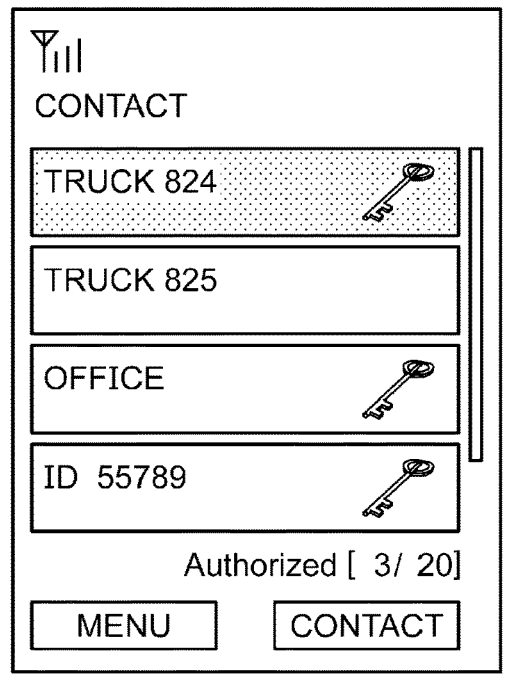
FIGS. 7A-7B are diagrams that each show a screen displayed by a display unit shown in FIG. 6.

The display unit 50 displays on the screen the display data (screen data) generated by the processing unit 42. Namely, it can be said that the display unit 50 displays the authentication status in the group based on the information received by the receiving unit 56. FIG. 7A shows an exemplary screen displayed by the display unit 50. This is a contact list screen and an example of a list of the names (terminal device names) of the other terminal devices 12. The storage unit 52 of the terminal device 12 stores correspondence information regarding correspondence between a terminal device ID and a terminal device name. The correspondence information is set and registered in advance using application software for wireless device setting or the like. For example, when authentication status information indicating that the terminal device ID "6700" has been authenticated, as shown in FIG. 4A, is received and when the correspondence information shows that the terminal device ID "6700" corresponds to the terminal device name "TRUCK 824", the terminal device name "TRUCK 824" and a key icon, which means "authenticated", are displayed. Also, when the terminal device ID "1234" has not been authenticated and when the correspondence information shows that the terminal device ID "1234" corresponds to the terminal device name "TRUCK 825", the key icon is not displayed beside "TRUCK 825". Since this list screen shows a terminal device to be a call partner, the screen displays information regarding authentication status excluding information of the terminal device displaying the screen (terminal device itself) therefrom. When there is no correspondence information, terminal device IDs, instead of terminal device names, may be displayed on the screen.

Further, a ratio of the number of authenticated terminal devices 12 among the other terminal devices 12 within the group ("3" in the example of FIG. 7A) with respect to the number of the other terminal devices 12 within the group ("20" in the example of FIG. 7A) is displayed as "Authorized" ("3/20" in the example of FIG. 7A). This ratio corresponds to the proportion of "authenticated" to the whole. Also, a ratio of the number of authenticated terminal devices 12 in the whole group with respect to the number of terminal devices 12 in the whole group including the terminal device 12 itself may be displayed. For example, when the number of terminal devices in the whole group is "21" and when the terminal device itself and other three terminal devices have been authenticated, "4/21" may be displayed.

Figure 7B:
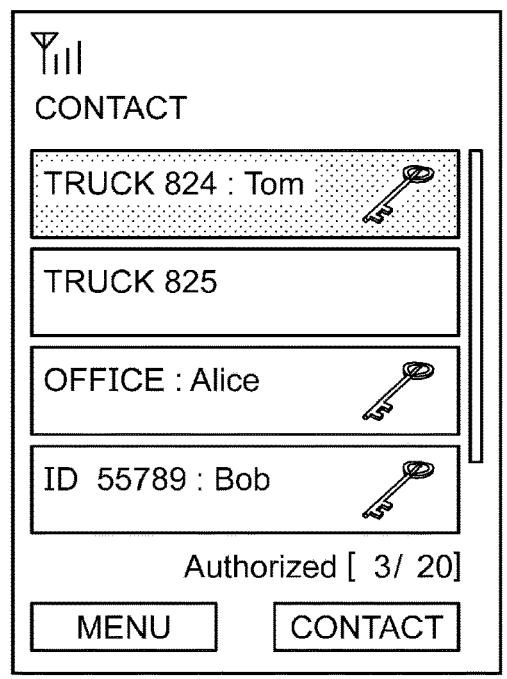

FIG. 7B shows another example of the list screen. In addition to the information displayed on the screen shown in FIG. 7A, user names are also displayed. In this case, information regarding authentication status needs to include a user name. In the example of FIG. 7B, the character strings of "Tom", "Alice", and "Bob" are the user names. For example, it is found that the terminal device with the name "TRUCK 824" is being used by the user with the name "Tom". In this manner, since who is using which terminal device can be found, users' convenience can be further improved.

Also, besides the contact list screen, a group member list screen may be generated by the processing unit 42, and the authentication status of users within the group may be displayed with icons and characters (including the proportion of "authenticated") on the group member list screen displayed by the display unit 50. Further, during a call, the display unit 50 may display the authentication status of the call partner or of users within the group.

When a terminal device 12 is used by multiple users, the setting of the terminal device 12 should desirably be provided for each user in order to provide improved operability to the users. When authentication processing is completed, the processing unit 42 performs setting for the authenticated user. In this specification, setting data specific to a user will be referred to as "private data". For example, the storage unit 52 stores multiple pieces of private data, and the processing unit 42 selects a piece of private data from the storage unit 52 according to the authenticated user name.

Instead of the storage unit 52, a base station device 10 may store the multiple pieces of private data. In this case, the processing unit 42 requests, via the communication unit 40, the base station device 10 to transmit private data. As a response thereto, the communication unit 40 receives private data from the base station device 10, and the processing unit 42 sets the private data. It may also be a server connected to the network 14 instead of the base station device 10. Further, at least one piece of private data may be stored in a charger used to charge the terminal device 12. When the terminal device 12 is connected to the charger, the processing unit 42 may receive private data from the charging terminal. The methods set forth above may be arbitrarily combined.

The private data may be a Unit ID, enabled or disabled state of a function, a Unit ID List, and a Group ID List, for example. Also, the private data may be data changed from basic data during operation. Further, the private data may be backed up when the terminal device 12 is turned off, when the terminal device 12 is connected to or disconnected from the charger, when a specific operation is performed on the terminal device 12, and when a user switching mode start key is operated during operation.

Figure 8:
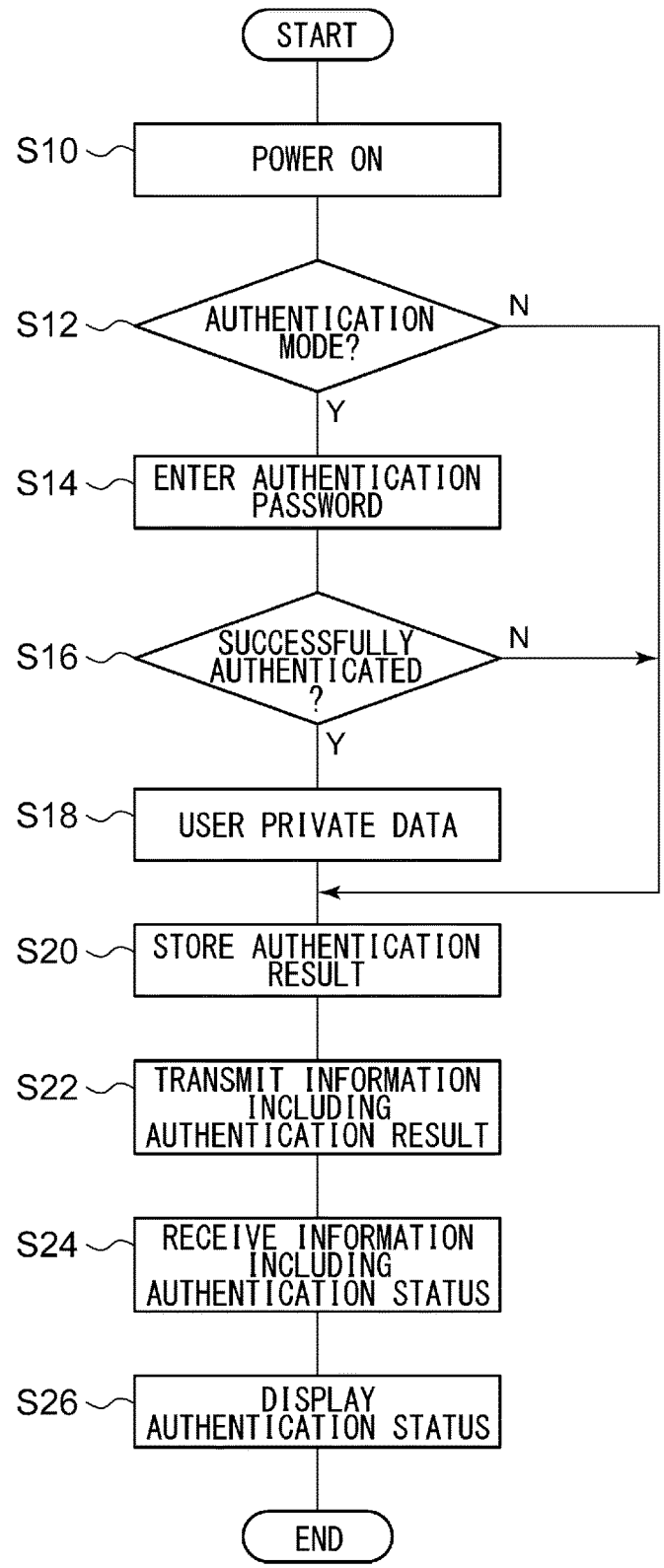
FIG. 8 is a flowchart that shows a display procedure performed by the terminal device shown in FIG. 6.

There will now be described an operation performed by the business-use wireless system 100 having the configuration set forth above. FIG. 8 is a flowchart that shows a display procedure performed by a terminal device 12. First, the terminal device 12 is turned on (S10). When the terminal device 12 is in the authentication mode (Y at S12), an authentication password is entered via the operation unit 48

(S14). If the authentication is successfully performed by the processing unit 42 and communication unit 40 (Y at S16), the processing unit 42 will set the user private data (S18). When the terminal device 12 is not in the authentication mode (N at S12) or if the authentication is unsuccessful (N at S16), the processes of steps 14 through 18 will be skipped. The storage unit 52 stores the authentication result (S20). The processing unit 42 and transmitting unit 54 then transmit information including the authentication result (S22). Thereafter, the receiving unit 56 and processing unit 42 receive information including authentication status (S24). Accordingly, the display unit 50 displays the authentication status (S26). The process of step 24 need not necessarily be performed in response to the process of step 22 and may be appropriately performed at required timing.

Figure 9:
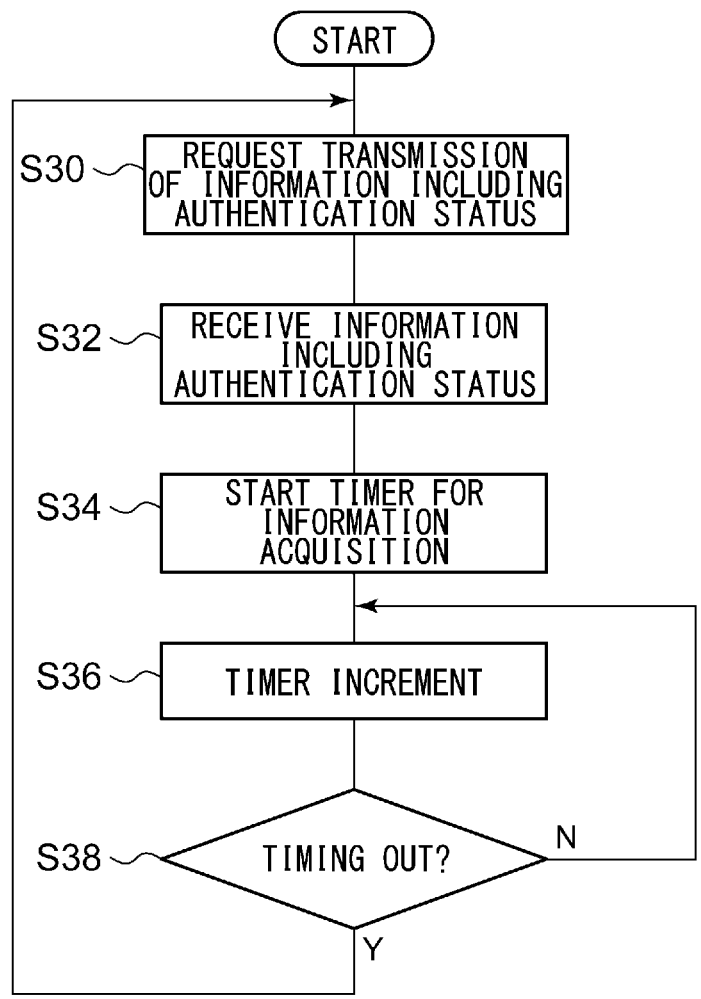
FIG. 9 is a flowchart that shows a procedure for requesting authentication status performed by the terminal device shown in FIG. 6.

FIG. 9 is a flowchart that shows a procedure for requesting authentication status performed by a terminal device 12. The processing unit 42 and transmitting unit 54 request transmission of information including authentication status (S30). Thereafter, the receiving unit 56 and processing unit 42 receive information including authentication status from the management device 20 via a base station device 10 (S32). The processing unit 42 starts a timer used for information acquisition (S34). The processing unit 42 then increments the timer (S36). If the timer does not time out (N at S38), the process will return to the step 36. If the timer times out (Y at S38), the process will return to the step 30. In this processing, since the terminal device 12 receives information including authentication status with a predetermined period, the user can always comprehend the latest authentication status.

Figure 10:
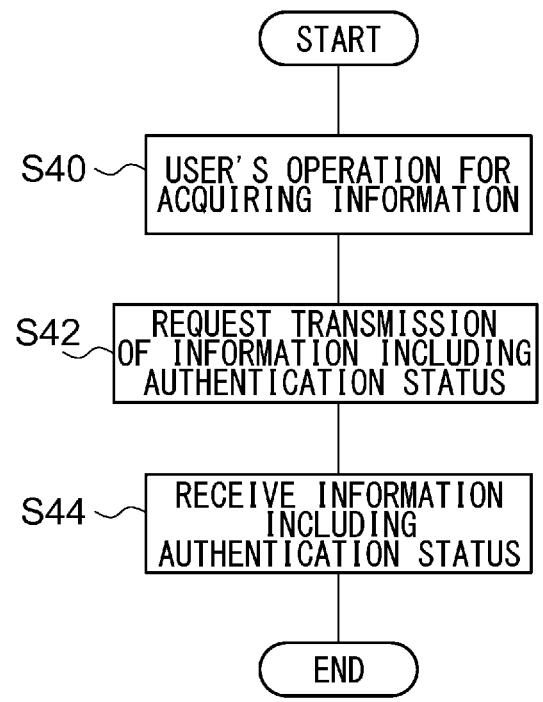
FIG. 10 is a flowchart that shows another procedure for requesting authentication status performed by the terminal device shown in FIG. 6.

FIG. 10 is a flowchart that shows another procedure for requesting authentication status performed by a terminal device 12. First, a user's operation for acquiring information is performed on the operation unit 48 (S40). The processing unit 42 and transmitting unit 54 request transmission of information including authentication status (S42). Thereafter, the receiving unit 56 and processing unit 42 receive information including authentication status from the management device 20 via a base station device 10 (S44).

Figure 11:
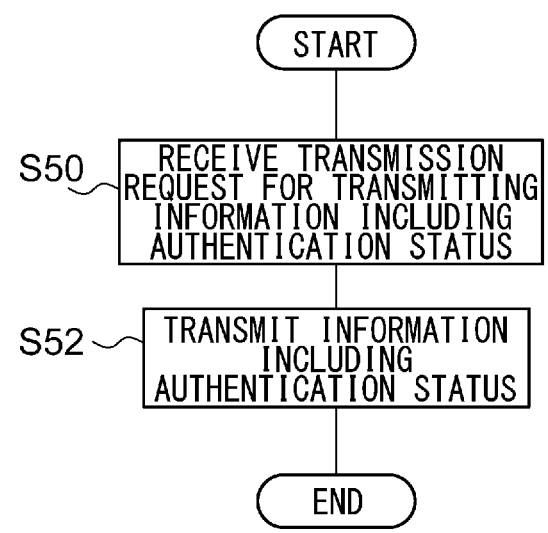
FIG. 11 is a flowchart that shows a procedure of notification of authentication status performed by the management device shown in FIG. 3.

FIG. 11 is a flowchart that shows a procedure of notification of authentication status performed by the management device 20. The receiving unit 62 and processing unit 32 receive a transmission request for transmitting information including authentication status (S50). Accordingly, the generating unit 34, processing unit 32, and transmitting unit 60 transmit information including authentication status (S52).

Figure 12:
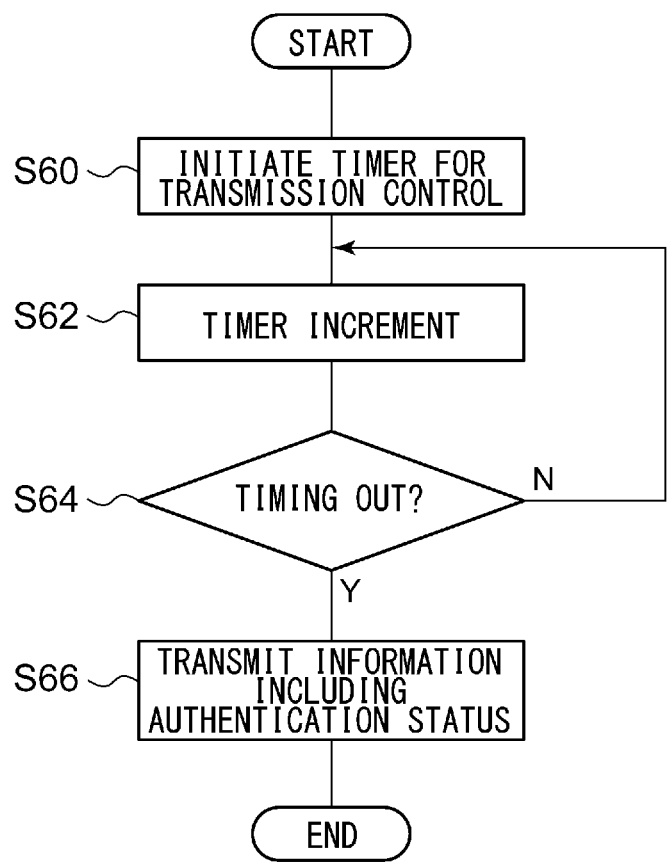
FIG. 12 is a flowchart that shows another procedure of notification of authentication status performed by the management device shown in FIG. 3.

FIG. 12 is a flowchart that shows another procedure of notification of authentication status performed by the management device 20. The processing unit 32 initiates a timer used for transmission control (a timer used to transmit information including authentication status with a predetermined period) (S60). The processing unit 32 then increments the timer (S62). If the timer does not time out (N at S64), the process will return to the step 62. If the timer times out (Y at S64), the generating unit 34, processing unit 32, and transmitting unit 60 will transmit information including authentication status (S66).

Figure 13:
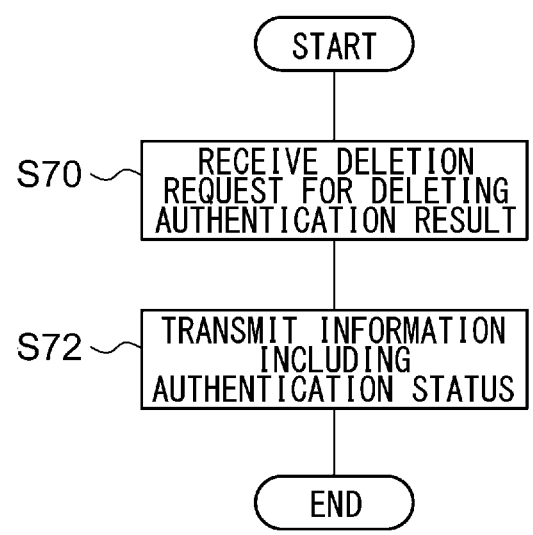
FIG. 13 is a flowchart that shows a procedure for deleting an authentication result performed by the management device shown in FIG. 3.

FIG. 13 is a flowchart that shows a procedure for deleting an authentication result performed by the management device 20. When a terminal device 12 is turned off, for example, a message of a deletion request is transmitted from the terminal device 12 (first terminal device 12a) via a base station device 10 to the management device 20. The receiving unit 62 and processing unit 32 receive the deletion request for deleting an authentication result (S70). Since the message of deletion request contains a terminal device ID, the terminal device ID (ID of the first terminal device 12a) is deleted from the current authentication status information so as to generate new authentication status information. Accordingly, the generating unit 34, processing unit 32, and transmitting unit 60 transmit information including the new authentication status to each terminal device 12 (S72).

According to the present embodiment, authentication result information is transmitted, and information regarding authentication status of terminal devices included in the group is received, so that the authentication status in the group can be comprehended when a call is made within the group. Also, since the authentication status in the group is displayed, the user can easily comprehend the authentication status, so as to have conversation appropriate for the authentication status (selecting the topics, for example). Also, since a ratio of the number of authenticated terminal devices among the other terminal devices within the group with respect to the number of the other terminal devices within the group is displayed, the authentication status can be comprehended more easily. Also, based on authentication result information, information regarding authentication status of terminal devices in the group, in which the subject terminal device is included, is generated and transmitted, so that the authentication status can be conveyed. Further, since pieces of authentication result information of the respective terminal devices are combined, detailed information regarding authentication status can be conveyed.

Since a user participating in the communication is revealed, the contents of conversation can be changed depending on the user. Also, since private setting for each user is provided in a terminal device, the single terminal device can be shared by multiple users. Since one terminal device is shared by multiple users, the number of terminal devices can be reduced. Since the number of terminal devices can be reduced, the operational costs can also be reduced. Further, when a terminal device is used, user authentication is performed and the result thereof is shared by users on the system, so that communication security can be ensured.

Since setting information of a terminal device is changed according to the user authentication, any terminal device can be operated with the user's own setting. Since any terminal device can be operated with the user's own setting, the user's convenience can be improved in an operational environment where a great number of terminal devices are used. Also, when a user enters a password (or a personal identification number) to a terminal device, the terminal device operates as the user's own terminal device, and the user's logging in can be conveyed to other users on the system.

Second Embodiment

Next, the second embodiment will be described. As with the first embodiment, the second embodiment also relates to a business-use wireless system comprising a management device. In the first embodiment, information indicating whether or not each terminal device included in the group has been authenticated is transmitted to each terminal device. The second embodiment is aimed at reducing the data amount of information regarding authentication status. A management device according to the second embodiment transmits, to a terminal device, a combination of the number of authenticated terminal devices and the number of unauthenticated terminal devices among the terminal devices in the group, as information regarding authentication status. As in the first embodiment, a terminal device displays a ratio of the number of authenticated terminal devices among the terminal devices 12 included in the group with respect to the number of the terminal devices included in the group. Further, when all the terminal devices within the group have been authenticated, display for notifying the user thereof is also provided. The business-use wireless system 100, management device 20, and terminal devices 12 according to the second embodiment are of similar types to those shown in FIGS. 1, 3, and 6. Accordingly, a description will be given mainly of the differences from the first embodiment.

In the management device 20 shown in FIG. 3, the storage unit 36 stores authentication result information of multiple terminal devices 12 included in each group, as in the first embodiment as shown in FIGS. 4A-4B. The generating unit 34 receives a database stored in the storage unit 36 via the processing unit 32. The generating unit 34 extracts information related to a group to be processed from the database. The generating unit 34 then statistically processes the authentication result information of the other terminal devices 12 in the group, to which the subject terminal device 12 belongs, to generate information including the results of the statistical processing.

As the statistical processing, the generating unit 34 calculates the number of authenticated terminal devices 12 and the number of unauthenticated terminal devices 12 in the group. The generating unit 34 generates information regarding authentication status by combining the number of authenticated terminal devices 12 and the number of unauthenticated terminal devices 12. FIG. 14 is a diagram that shows a structure of data output from the management device 20 according to the second embodiment. As shown in FIG. 14, "the number of authenticated users" and "the number of unauthenticated users" are included. In FIG. 14, "the number of authenticated users" corresponds to the number of authenticated terminal devices 12, and "the number of unauthenticated users" corresponds to the number of unauthenticated terminal devices 12.

The receiving unit 56 shown in FIG. 6 receives, from a base station device 10, information regarding authentication status of the other terminal devices 12 within the group. The processing unit 42 receives the information regarding authentication status from the receiving unit 56. Based on the information regarding authentication status, the processing unit 42 calculates a ratio of the number of authenticated terminal devices 12 among the other terminal devices 12 within the group with respect to the number of the other terminal devices 12 within the group. The process will be specifically described assuming the case as an example where "the number of authenticated users" and "the number of unauthenticated users" output from the management device 20 are "4" and "17", respectively. First, the terminal device 12 that has received the information regarding authentication status defines the value obtained by subtracting "1", corresponding to the terminal device 12 itself, from the sum of the two values in the information, i.e., 4+17−1=20, as the number of the other terminal devices 12 within the group. Next, when the terminal device itself has been authenticated, the terminal device 12 defines the value obtained by subtracting "1" from "the number of authenticated users" as the number of authenticated terminal devices 12 among the other terminal devices 12 within the group. If the terminal device itself has been authenticated in the above example, the calculation will be "4−1=3". If the terminal device itself has not been authenticated, "the number of authenticated users" as received will be used as it is.

Figure 15:
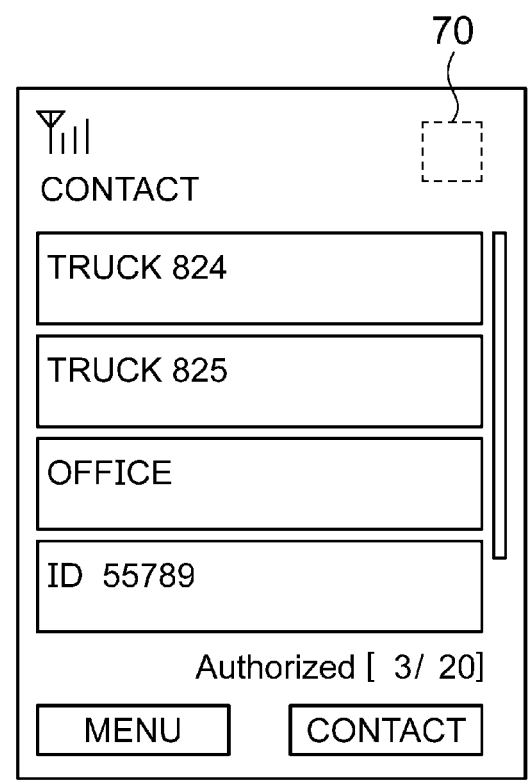
FIG. 15 is a diagram that shows a screen displayed by the display unit of a terminal device according to the second embodiment.

The display unit 50 displays a screen generated by the processing unit 42. FIG. 15 shows a screen displayed by the display unit 50 of a terminal device 12 according to the second embodiment. Similarly to FIGS. 7A-7B, FIG. 15 shows a contact list screen, which is a list of users using the other terminal devices 12. Since the information regarding authentication status does not include information indicating whether or not each terminal device has been authenticated, key icons for authenticated terminal devices are not displayed, unlike in FIGS. 7A-7B. Meanwhile, a ratio of the number of authenticated terminal devices 12 among the other terminal devices 12 within the group with respect to the number of the other terminal devices 12 within the group is displayed as "Authorized", which is "3/20" in the example of FIG. 15. Also, a ratio of the number of authenticated terminal devices 12 in the whole group with respect to the number of terminal devices 12 in the whole group including the terminal device 12 itself may be displayed; namely, "4/21" may be displayed in the above example. Also, the display may be provided using percent, such as "15% of the terminal devices have been authenticated". Further, the display may be provided without a ratio, such as "3 terminal devices have been authenticated" or "3 authenticated: 17 unauthenticated". Namely, information based on the number of authenticated terminal devices among the terminal devices included in the group may be displayed.

In a part of the screen, a notification area 70 is provided. The notification area 70 is displayed in "red" when there is an unauthenticated terminal device 12 among the other terminal devices 12 within the group. Also, the notification area 70 is displayed in "blue" when all of the other terminal devices 12 within the group have been authenticated. In this way, the color of the notification area 70 to be displayed is changed according to whether or not all of the other terminal devices 12 within the group have been authenticated. Namely, the display unit 50 shows that all of the other terminal devices 12 have been authenticated when all of the other terminal devices 12 within the group have been authenticated. The notification area 70 may also be provided in the first embodiment. Also, the notification area 70 may be displayed in "blue" only when all the terminal devices 12 including the terminal device itself have been authenticated. Also, when the terminal device itself has not been authenticated, special display may be provided, such as displaying the notification area 70 in "yellow". Further, when the terminal device itself has not been authenticated, the display may be changed according to the number of authenticated terminal devices 12 within the group. For example, the color or the flashing speed of the display may be changed according to the number of authenticated terminal devices 12 within the group, and the notification area 70 may be displayed in "orange" flashing with a short period when only the terminal device itself has not been authenticated. With such a method, when a user using a terminal device 12 forgets to perform authentication operation, for example, the user's awareness can be promoted, so that the number of authenticated terminal devices within the group can be increased.

According to the present embodiment, since a combination of the number of authenticated terminal devices and the number of unauthenticated terminal devices among the terminal devices in the group is transmitted as information regarding authentication status, the amount of data to be transmitted can be reduced. Also, when all of the other terminal devices within the group have been authenticated, the fact that all of the other terminal devices have been authenticated is displayed, so that the authentication status can be easily comprehended.

Third Embodiment

Next, the third embodiment will be described. As with the first and second embodiments, the third embodiment also relates to a business-use wireless system comprising a management device. The third embodiment corresponds to the combination of the first embodiment and the second embodiment. In the first embodiment, since the management device transmits, to a terminal device, information regarding terminal devices within the group, detailed information is conveyed. Meanwhile, in the second embodiment, since the management device transmits statistically processed information to a terminal device, the transmission capacity can be reduced. Accordingly, the third embodiment is aimed at conveying detailed information while reducing transmission capacity. A management device according to the third embodiment transmits statistically processed information to a terminal device, which then displays the information, as in the second embodiment. When the user checks the display and desires more detailed information, the terminal device transmits to the management device a transmission request for transmitting information regarding the respective terminal devices within the group. Subsequently, processing similar to that in the first embodiment is performed. The business-use wireless system 100, management device 20, and terminal devices 12 according to the third embodiment are of similar types to those shown in FIGS. 1, 3, and 6. Accordingly, a description will be given mainly of the differences from the first and second embodiments.

The generating unit 34 shown in FIG. 3 generates information regarding authentication status by combining the number of authenticated terminal devices 12 and the number of unauthenticated terminal devices 12. The transmitting unit 60 then outputs the information regarding authentication status in the format shown in FIG. 14. The receiving unit 56 shown in FIG. 6 receives, from a base station device 10, information regarding authentication status of terminal devices 12 included in the group. The processing unit 42 and display unit 50 display a screen as shown in FIG. 15. Thereafter, the user operates the operation unit 48 to input an instruction for requesting transmission of detailed information. Upon reception of the input of the instruction, the processing unit 42 generates a transmission request, and the transmitting unit 54 transmits the transmission request to a base station device 10 using an uplink control channel.

The receiving unit 62 of the management device 20 shown in FIG. 3 receives the transmission request via the base station device 10 and the network 14. The generating unit 34 then generates information regarding authentication status by combining pieces of authentication result information of the respective terminal devices 12 within the group. Accordingly, the transmitting unit 60 outputs the information regarding authentication status in the format shown in FIG. 5. The receiving unit 56 shown in FIG. 6 receives, from the base station device 10, information regarding authentication status of the other terminal devices 12 within the group. The processing unit 42 and display unit 50 display a screen as shown in FIGS. 7A-7B.

Figure 16:
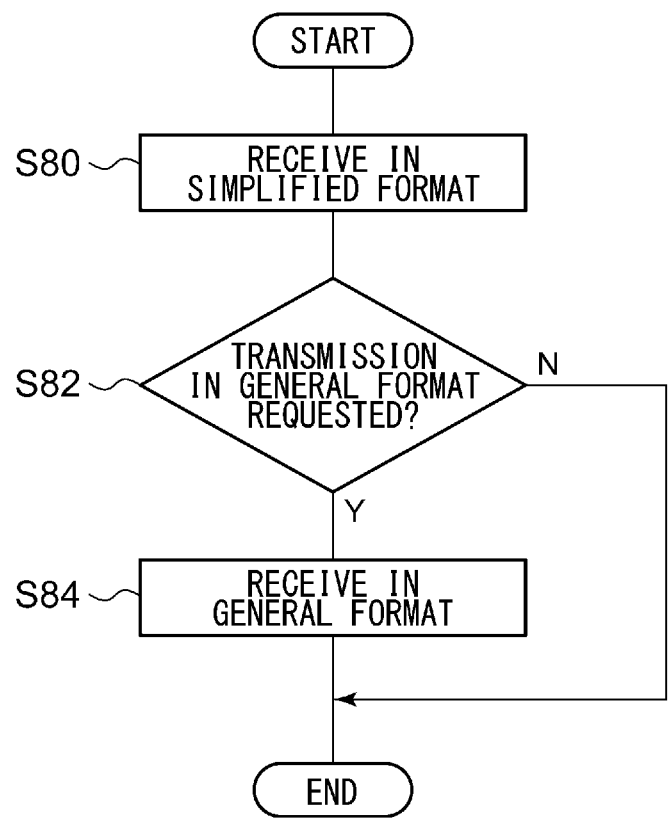
FIG. 16 is a flowchart that shows a receiving procedure performed by a terminal device according to a third embodiment.

FIG. 16 is a flowchart that shows a receiving procedure performed by a terminal device 12 according to the third embodiment. The receiving unit 56 and processing unit 42 receive information regarding authentication status in a simplified format including a combination of the number of authenticated terminal devices and the number of unauthenticated terminal devices (S80). If the processing unit 42 and transmitting unit 54 request transmission in a general format (Y at S82), the receiving unit 56 and processing unit 42 will receive information regarding authentication status in the general format in which authentication results of the respective terminal devices 12 within the group are combined (S84). If the processing unit 42 and transmitting unit 54 do not request transmission in the general format (N at S82), the process of step 84 will be skipped.

According to the present embodiment, since a combination of the number of authenticated terminal devices and the number of unauthenticated terminal devices is transmitted as information regarding authentication status before information regarding the respective terminal devices is transmitted, detailed information can be conveyed while reducing the transmission capacity.

The present invention has been described with reference to the embodiments. The embodiments are intended to be illustrative only, and it will be obvious to those skilled in the art that various modifications to a combination of constituting elements or processes could be developed and that such modifications also fall within the scope of the present invention.

In the first through third embodiments, a terminal device 12 initiates a call with another terminal device 12 to be a call partner, regardless of whether or not the another terminal device 12 has been authenticated. However, the operation is not limited thereto, and the processing unit 42 may change the strength of encryption used for the call according to whether or not the another terminal device 12 has been authenticated. Also, the processing unit 42 may restrict incoming calls so as not to receive calls from other terminal devices 12 that have not been authenticated. The processing unit 42 may also restrict outgoing calls so as not to make calls to other terminal devices 12 that have not been authenticated. Further, a terminal device 12 may light or blink a light emitting diode (LED) for warning during a call with another terminal device 12 that has not been authenticated. This modification improves communication security.

Also, in the first through third embodiments, a terminal device 12 conveys authentication status by means of the display of the display unit 50. However, the terminal device 12 may convey the authentication status by means of synthesized voice or by outputting the authentication status to an external device, such as a headset and an external display device. Also, the terminal device 12 may comprise a conveying unit that outputs authentication status to be conveyed to a user.

In the first through third embodiments, the management device 20 is connected to the network 14. However, the operation is not limited thereto, and the management device 20 may be provided within a base station device 10. This modification allows greater flexibility in configuration.

What is claimed is:

1. A terminal device used in a communication system in which a base station device assigns a plurality of wireless channels to respective communication groups so that a signal transmitted from a single terminal device is concurrently received by a plurality of terminal devices belonging to a same communication group, and group communication in which information is concurrently shared by three or more terminal devices belonging to the same communication group and which can be joined regardless of an authentication status is performed, the terminal device comprising:
   a receiver that receives, from the base station device, information regarding an authentication status indicating whether user authentication, for authenticating a user using another terminal device belonging to the same communication group as a legitimate user, has been made in the another terminal device; and
   a screen that displays, for each of the terminal devices belonging to the same communication group, information indicating whether a user using the terminal device has been authenticated on a basis of the information received by the receiver.

2. The terminal device according to claim 1, further comprising a transmitter that transmits, to the base station device, authentication information indicating whether user authentication for authenticating a user using the terminal device is a legitimate user has been made, prior to group communication and when a position registration process for registering the terminal device in the base station device is performed, wherein
the transmitter transmits, as the authentication information, identification information for identifying a terminal device, and the identification information is different in accordance with whether or not a user using the terminal device has been authenticated.

3. A management device used in a communication system in which a base station device assigns a plurality of wireless channels to respective communication groups so that a signal transmitted from a single terminal device is concurrently received by a plurality of terminal devices belonging to a same communication group, and group communication in which information is concurrently shared by three or more terminal devices belonging to the same communication group and which can be joined regardless of an authentication status is performed, the management device comprising:
a receiver that receives, from each of the plurality of terminal devices belonging to the same communication group, information indicating whether user authentication, for authenticating a user using the terminal device as a legitimate user, has been made in the terminal device;
a generator that generates information regarding an authentication status of each of the plurality of terminal devices belonging to the communication group on a basis of the information received by the receiver; and
a transmitter that transmits information generated by the generator to a terminal device belonging to the same communication group.

4. A communication system in which a base station device assigns a plurality of wireless channels to respective communication groups so that a signal transmitted from a single terminal device is concurrently received by a plurality of terminal devices belonging to a same communication group, and group communication in which information is concurrently shared by three or more terminal devices belonging to the same communication group and which can be joined regardless of an authentication status is performed, the communication system comprising:
a management device that receives, from each of the plurality of terminal devices belonging to the same communication group, information indicating whether user authentication, for authenticating a user using the terminal device as a legitimate user, has been made in the terminal device, generates information regarding an authentication status of the plurality of terminal devices belonging to the same communication group, and transmits the generated information to the terminal device via the base station device; and
a terminal device that receives, from the base station device, information regarding an authentication status of a plurality of other terminal devices belonging to the same communication group and displays the received information on a screen, wherein
communication is performed such that a signal transmitted from a single terminal device is concurrently received by a plurality of terminal devices belonging to the same communication group regardless of the authentication status of the terminal device.

5. A non-transitory computer-readable memory medium storing a computer program for a terminal device used in a communication system in which a base station device assigns a plurality of wireless channels to respective communication groups so that a signal transmitted from a single terminal device is concurrently received by a plurality of terminal devices belonging to the same communication group, and group communication in which information is concurrently shared by three or more terminal devices belonging to the same communication group and which can be joined regardless of an authentication status is performed, the computer program comprising:
receiving, from the base station device, information regarding an authentication status indicating whether user authentication, for authenticating a user using another terminal device belonging to the same communication group as a legitimate user, has been made in said another terminal device; and
displaying, for each of the terminal devices belonging to the same communication group, information indicating whether a user using the terminal device has been authenticated on a basis of received information.

6. A communication method performed by a terminal device used in a communication system in which a base station device assigns a plurality of wireless channels to respective communication groups so that a signal transmitted from a single terminal device is concurrently received by a plurality of terminal devices belonging to a same communication group, and group communication in which information is concurrently shared by three or more terminal devices belonging to the same communication group and which can be joined regardless of an authentication status is performed, the communication method comprising:
receiving, from the base station device, information regarding an authentication status indicating whether user authentication, for authenticating a user using another terminal device belonging to the same communication group as a legitimate user, has been made in said another terminal device; and
displaying, for each of the terminal devices belonging to the same communication group, information indicating whether a user using the terminal device has been authenticated on a basis of received information.

7. A non-transitory computer-readable memory medium storing a computer program for a management device used in a communication system in which a base station device assigns a plurality of wireless channels to respective communication groups so that a signal transmitted from a single terminal device is concurrently received by a plurality of terminal devices belonging to a same communication group, and group communication in which information is concurrently shared by three or more terminal devices belonging to the same communication group and which can be joined regardless of an authentication status is performed, the computer program comprising:
receiving, from each of the plurality of terminal devices belonging to the same communication group, information indicating whether user authentication, for authenticating a user using the terminal device as a legitimate user, has been made in the terminal device;
generating information regarding an authentication status of each of the plurality of terminal devices belonging to the communication group on a basis of the information received; and transmitting generated information to a terminal device belonging to the same communication group.

8. The terminal device according to claim 1, wherein the screen displays, for a plurality of other terminal devices belonging to the same communication group, an icon indicating that the user has been authenticated and a name of the authenticated user in association with a terminal name of the terminal device in which the user has been authenticated.

9. The terminal device according to claim 1, wherein the screen displays, for a plurality of other terminal devices belonging to the same communication group, the number of terminal devices in which the user has been authenticated or a proportion of the terminal devices in which the user has been authenticated.

10. The terminal device according to claim 1, wherein the screen changes, for a plurality of other terminal devices belonging to the same communication group, a display mode of a screen depending on whether all users using the respective terminal devices have been authenticated.

11. The terminal device according to claim 1, further comprising:
a touch panel that the user enters a password on, the password being defined for the same communication group or for each user;
a CPU that checks the password entered on the touch panel against master data to determine whether the user using the terminal device is a legitimate user; and
a transmitter that transmits a result of determination in the CPU to the base station device.

* * * * *